Dec. 28, 1948.　　R. W. JOHNSON ET AL　　2,457,378
GAS CONTROL VALVE
Filed June 5, 1944　　3 Sheets-Sheet 1
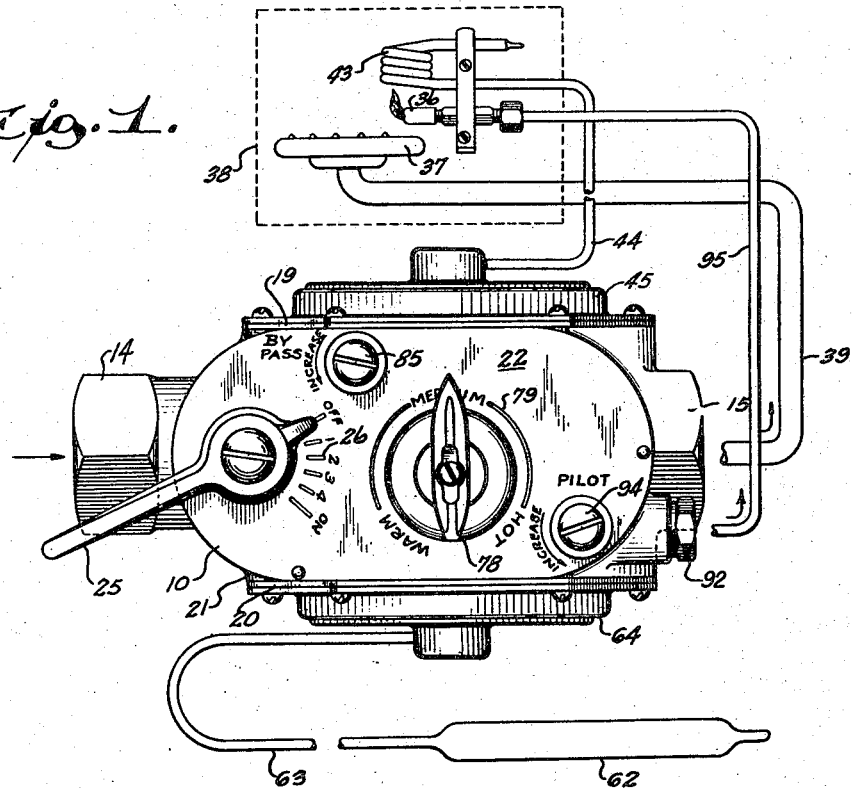
Fig. 1.
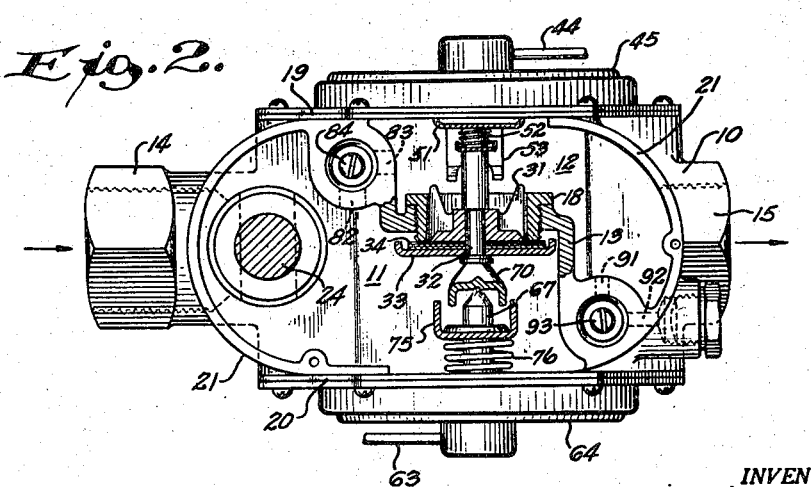
Fig. 2.
INVENTORS.
ROY W. JOHNSON
CEDRIC E. ZARWELL
ATTORNEY.

Dec. 28, 1948.  R. W. JOHNSON ET AL  2,457,378
GAS CONTROL VALVE
Filed June 5, 1944  3 Sheets-Sheet 2

INVENTORS.
ROY W. JOHNSON
CEDRIC E. ZARWELL
BY
ATTORNEY.

Dec. 28, 1948.  R. W. JOHNSON ET AL  2,457,378
GAS CONTROL VALVE
Filed June 5, 1944  3 Sheets-Sheet 3

INVENTORS.
ROY W. JOHNSON
CEDRIC E. ZARWELL.
BY John W. Michael
ATTORNEY.

Patented Dec. 28, 1948

2,457,378

UNITED STATES PATENT OFFICE 2,457,378

GAS CONTROL VALVE

Roy W. Johnson and Cedric E. Zarwell, Milwaukee, Wis., assignors to Automatic Products Company, Milwaukee, Wis., a corporation of Wisconsin Application June 5, 1944, Serial No. 538,729

8 Claims. (Cl. 236—1)

This invention relates to improvements in devices for automatically controlling the flow of fuel to a space-heating device which is to be constantly kept in condition for operation.

When a space-heating furnace is fed with gaseous fuel, a pilot flame must be constantly maintained to insure ignition of all of the gases supplied and thereby prevent the formation of explosive or otherwise dangerous mixtures thereof with air. And the quantity of the gas supplied to the burner during normal operation must be determined by the varying temperature of the space to be heated which causes variations in the fuel flow to the furnace. The supply of gaseous fuel should therefore be primarily controlled responsive to the presence or absence of the pilot flame and only secondarily controlled by the temperature of the space to be heated. The valve controlling the flow of gas to the burner must be closed when the pilot flame is out regardless of the action of the room or other space thermostat, and must be opened and closed by such thermostat at all other times. It is also desirable that the control of the valve by the room or other space thermostat be modified by a device limiting the amount of fuel supplied in case the room or other space thermostat accidentally remains in position to open the valve. Other devices related to the limitation of the quantity of fuel to be supplied, or for other safety reasons, may also be required, all of which devices must coact with the pilot flame and room thermostats on the control valve.

It is therefore one object of the present invention to provide an automatic regulator for the supply of gaseous fuel to a heating device in which the valve of the regulator is controlled jointly by the existence of a pilot flame and the temperature of the space to be heated.

Another object of the invention is to provide a valve with means for automatically controlling the supply of gaseous fuel to a burner in which mechanically actuated means, responsive severally to the temperature adjacent a pilot flame and to the temperature in a space to be heated, coact on the valve.

Another object of the invention is to provide a valve for automatically controlling the flow of gas to a burner, which is primarily controlled by means responsive to the temperature in a space adjacent the burner and in which the action of such means is modified by means controlled from a point remote from the burner.

Another object of the invention is to provide a gas flow regulator for a gaseous fuel burning device in which the regulator includes means responsive severally to the temperature adjacent a pilot flame and to the temperature in a space to be heated, and in which the actuation of one of such temperature responsive means may be modified to adjust the temperature range through which such means will be operative.

Another object of the invention is to provide a regulating valve for automatically controlling the flow of gas to a gas-burning space-heating furnace in which mechanically actuated means responsive to a temperature adjacent the burner is combined with electrically energized means responsive to a temperature remote from the furnace for cooperatively controlling the valve.

Objects and advantages other than those above set forth will be apparent from the following description when read in connection with the accompanying drawings, in which:

Fig. 1 is a top view of the automatic regulating valve of the present invention, together with a diagrammatic illustration of the connection of such valve with a gas burner, and with mechanically actuated means for controlling the operation of the valve;

Fig. 2 is a view of the valve shown in Fig. 1 with the top plate removed and with some of the parts thereof shown in section for better illustration thereof;

Figure 3:
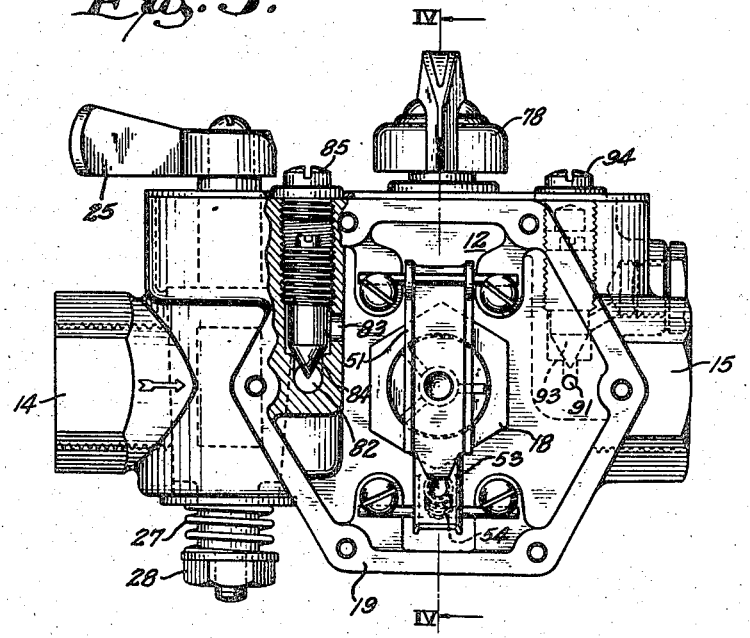
Fig. 3 is a side elevation of the valve with one of the thermal-responsive means removed therefrom and with some of the parts broken away to illustrate the construction of the by-pass for supplying a pilot burner.
Figure 4:
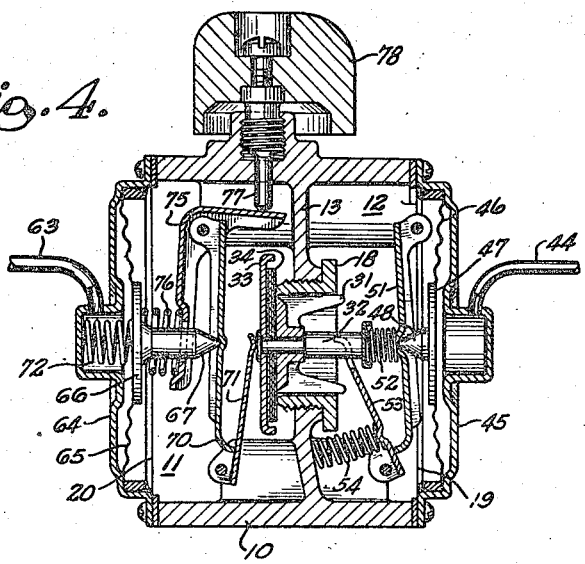
Fig. 4 is a view taken on the plane of the line IV—IV of Fig. 3 and looking in the direction of the arrows applied thereto.

Fig. 5 is a view similar to that shown in Fig. 4 and showing the addition of electrically energized and remotely controlled means for modified action of one of two mechanically actuated means controlling the valve; and Fig. 6 is a view similar to Fig. 4 but showing one of the mechanically actuated thermal-responsive means acting on the valve replaced by a remotely controlled and electrically energized means.

Referring more particularly to the drawings by characters of reference, the reference numeral 10 designates a valve housing which is divided into separate inlet and outlet chambers 11 and 12, respectively, by a partition 13 extending transversely of the housing. The valve housing is adapted to be connected to a source of gas under pressure by a conduit (not shown) connected to a pipe nipple 14 at the inlet end of the valve housing and is adapted to be connected to a burner by a pipe nipple 15 at the outlet end of the housing. The transverse partition 13 of the valve housing is provided with an opening having a ring 18 removably secured therein as by screw-threading. The ring 18 determines the size of the orifice between the inlet chamber 11 and outlet chamber 12 and hence determines the amount of gas which may flow through the valve housing. The valve housing is formed with an opening in each of its sides 19 and 20 and with an opening in the top 21 thereof. The side openings provide means by which access may be had to the inlet and outlet chambers, respectively, and are severally closed by a portion of several thermostatic means to be hereinafter described. The opening in the valve housing top is closed by a plate 22 bearing identification, instruction, and other desired indicia.

Flow of gas into the valve housing is controlled by a valve 24 which is of the plug type and is provided with a handle 25 externally of the top of the valve and forming a pointer for movement over a scale 26 which shows the degree of opening of the valve 24. The valve is held seated in a conical recess formed therefor in the valve housing, by a spring 27 acting between the outside of the valve housing and a suitable nut 28, or other means, holding the spring in compression and thereby holding the valve firmly seated in its recess. The opening through the orifice ring 18 is controlled by a valve which is thermally actuated by the cooperative action of a number of thermally responsive means and which includes a guide 31 fitting in and guided in its movements by the orifice ring. A stem 32 fits into a hub in the guide and bears a cup 33 on the end of the stem extending into the inlet chamber 11. The cup provides retaining means for one or more washers 34 of leather or other resilient material unaffected by the gas passing through the valve and forming the valve portion seating on the edge of the orifice ring 18 as the closure controlling the flow of gas through the orifice.

The valve consisting of parts 31, 33 and 34 is controlled jointly by a plurality of thermostatic means, one of which is responsive to the temperature adjacent a pilot burner 36 (see Fig. 1) for igniting a main burner 37 of a space heating furnace 38. The burner 37 is connected with the valve outlet nipple 15 by a pipe 39. The pilot flame temperature responsive means includes a bulb 43 filled with a chemically inert gas such as nitrogen and shown as being in the form of a four turn coil for the purpose of securing the maximum heat transfer surface with a small volumetric capacity of the tubing. The bulb 43 is connected by a tube 44 to a space defined by a cover 45 for the opening in housing side 19 and by a diaphragm 46 suitably secured at its edges in the cover. The diaphragm 46 has mounted thereon a pad 47 with a pointed projecting boss 48. The boss movement caused by the expansion of the nitrogen filling the bulb 43, the tube 44, and the space between the cover 45 and the diaphragm 46, is transmitted to a lever 51 pivotally mounted at one end in the valve housing and provided with a cup in which the pointed end of the boss seats. The lever acts on a spring 52 seated between the lever cup and a cup on end of valve stem 32. The free end of the lever 51 bears on a second lever 53 also pivotally mounted in the housing at one end thereof and formed with a forked and rounded end bearing against the cup on the control valve stem for spring 52 and under the action of a spring 54 seated on the partition 13 and determining the temperature at which the pilot flame opens the valve. The present arrangement of the levers produces a high force multiplication in the space available in a regulating device.

A second thermostatic means responsive to the temperature of a space to be heated, such as the bonnet of the furnace 38, is connected to the valve housing on the side 20 thereof and coacts with the above described thermostatic means for controlling the movement of the valve consisting of parts 31, 33 and 34. The heated space thermostatic means comprises a bulb 62 (see Fig. 1), located in the space to be heated and connected by a tube 63 with the space between a cover 64 for the opening in the valve housing side 20 and a diaphragm 65 suitably mounted in such cover. A pad 66 is mounted on the diaphragm 65 and is formed with a pointed projecting boss 67. The movement of the diaphragm 65 responsive to the expansion and contraction of a suitable liquid, such as ethyl chloride filling the bulb 62, the tubes 63, and the space between cover 64 and diaphragm 65, is transmitted by way of the boss 67 to a lever 70 pivoted at one end in the valve housing and bearing at the other end thereof on a lever 71. A spring 72 acts between the cover and the pad to compensate for differences in pressure between atmosphere and the ethyl chloride when filled in the tube 62, 63 and the space connected therewith.

The action of the thermally responsive means causing movement of the boss 67, and acting on the leverage 70, 71, is modified by means for adjusting the ranges within which such movement may take place. Such adjusting or modifying means includes a bell crank lever 75 pivotally mounted in the valve housing and having a spring 76 seated on one arm at the end thereof and bearing on the pad 66. An adjusting screw 77 extends through the top of the valve housing and bears at one end on the other arm of the bell crank 75. The end of the screw 77, extending externally of the housing top, is provided with a handle 78 by which the screw may be turned for adjusting the position of the bell crank and hence the action of the spring 76 on the diaphragm boss 66. A portion of the handle 78 is formed as a pointer for movement over a scale 79 on the top plate 22 and indicates the temperature ranges within which movement of the heated space or furnace bonnet responsive thermostatic means is to be retained.

A by-pass, between the inlet chamber 11 and the outlet chamber 12 and around the control valve 31, 33, 34, is formed by passages 82, 83, the flow of gas through such passages being controlled by an adjustable needle valve 84. The needle valve 84 is adjusted at the factory and access thereto is limited by closing the needle valve recess by a cap screw 85. The amount of gas passing from the outlet chamber 12 to the pilot burner 36 is controlled by a metering valve including the passages 91, 92 in which the flow is controlled by a needle valve 93, and access to the metering valve 93 is also limited by a cap screw 94. The passage 92 is of course connected with the pilot burner 36 as by the tube 95. The by-pass 82, 83, 84 controls the quantity of gas by-passing the control valve for the purpose of maintaining both a low fire at burner 37 and for maintaining the pilot flame while by-pass 91, 92, 93 controls only the quantity of gas supplied to the pilot burner 36.

The action of the bonnet temperature responsive means 63 to 67, inclusive, may be modified by electrically energized means responsive to the temperature in a remote space to be heated, thus combining the use of the bonnet responsive means as a limit control with the room temperature responsive means. In such modified structure (shown in Fig. 5) an opening is made through the exterior wall of the chamber 11 and a box 96 is mounted on the chamber wall in gas-tight relation over the opening. An electromagnet 97 is mounted in insulated relation in the box in such position that an extension 71' of the lever 71 may be drawn into contact with the armature of the magnet. The magnet coil is connected in circuit with the room thermostat 98 which controls the supply of electric potential to the coil from a transformer 99 connected with an electrical supply line 100. The construction above described provides for joint control of the valve consisting of parts 31, 33 and 34 by means responsive to the temperature of the pilot flame, means responsive to the furnace bonnet temperature, and means responsive to the temperature of the space to be heated. The first of the above means prevents flow of gas to the main burner when the pilot flame is out and the second of the above means prevents the continued supply of gas when the bonnet temperature is excessive and constitutes a safety means limiting the valve operation regardless of the action of the room thermostat in calling for more heat.

One of the two thermally responsive mechanically acting operating means for the valve consisting of parts 31, 33 and 34 may be replaced by a thermally responsive electric operating means as shown in Fig. 6. In such structure the cover 64 for the opening in the valve housing side 20 is replaced by a plate 105 attached to the valve housing 10 in gas-tight relation and provided with a flanged substantially central opening therethrough. The opening through the plate 105 is closed by a tube 106 extending into the chamber 11 and open at its end within the chamber, the other end of the tube being closed by a plug 107 secured in the tube in gas-tight relation as by welding. The tube 106 and its plug 107 accordingly form a well open to the inlet chamber 11 of the valve housing and extending beyond the valve housing into a casing 108.

An electrical winding 109 is placed about the well 106, 107 and is pressed against the plate 105 by a spring 110 acting between the casing 108 and a layer of insulating material 111 placed on the winding 109. The winding 109 forms the coil of a solenoid having its armature 114 located within the well 106, 107, and guided therein as by fins 115 on the armature and moving in contact with the well wall. The armature is biased into contact with the end of the valve stem 32 by a spring 116 acting between the plate 105 and a seat 117 of electric insulating material mounted on the end of the armature as by a nut 118 threaded thereon. The winding 109 is energized from the supply line 121 acting through a transformer 122 and such energization may be controlled only by a temperature responsive device such as the room thermostat indicated at 123 or jointly by the thermostat 123 and other temperature responsive devices, such as indicated at 124, which may be used to limit the temperature as is desirable for instance in the bonnet of the furnace.

It will be seen from the above description that the present invention provides a valve for automatically regulating the flow of gas to a space-heating furnace in which the valve action is cooperatively controlled by a plurality of thermo-responsive means severally responsive to different temperatures. In such furnace it is desirable that the valve be opened responsive to the temperature of a room or rooms to be heated, but valve opening must be prevented unless a pilot flame is available to ignite the gas flowing from the main burner. The room temperature responsive means of course must be adjustable and flow of gas to both the pilot and the main burner must also be adjustable. Even if a pilot flame is available, the long continued closure of the room temperature responsive means for any reason might result in supplying so much heat as to be dangerous and it is accordingly desirable that the action of the room thermostat be modified by thermally responsive means so placed that furnace temperature cannot exceed a safe limit. The present disclosure illustrates the use of mechanically actuated means for cooperatively controlling the valve or for the use of electrically energized means in conjunction with such mechanically actuated means, and the use of a remotely controlled, electrically energized means in place of one of the mechanically actuated thermal responsive means but it will be obvious that various combinations may be used.

Although but a few embodiments of the present invention have been illustrated and described, it will be apparent to those skilled in the art that various changes and modifications may be made therein without departing from the spirit of the invention or from the scope of the appended claims.

We claim:

1. In a system for controlling the supply of a fluid fuel, a space heating main burner, a pilot burner, a valve casing, a valve within the casing for controlling flow of fuel to the main burner, means responsive to combustion of fuel at the pilot burner, resilient means acting between the valve and the pilot responsive means for urging the valve open during combustion of fuel at the pilot burner, a spring biased leverage within the casing urging the valve toward closed position upon extinguishment of the pilot flame, means responsive to the temperature in the space to be heated, and a second leverage within the casing and actuated by the space respective means to urge the valve closed upon increase in the space temperature above a predetermined value.

2. In a system for controlling the supply of a fluid fuel, a space heating main burner, a pilot burner, a valve casing, a valve within the casing for controlling flow of fuel to the main burner, means responsive to the combustion of fuel at the pilot burner, a spring compressed between the valve and the pilot burner responsive means for urging the valve opened during combustion of fuel at the pilot burner, a spring biased leverage effective upon expansion of the first spring to urge the valve toward closed position, means responsive to the temperature of the space to be heated, and a second leverage within the casing and actuated by the space temperature responsive means to urge the valve closed upon increase in the space temperature.

3. In a system for controlling the supply of a fluid fuel, a space heating main burner, a pilot burner, a valve casing, a valve within the casing for controlling flow of fuel to the main burner, means defining a chamber expanding in response to combustion of fuel at the pilot burner and contracting upon extinguishment of the pilot flame, a compression spring seated between the valve and the chamber for urging the valve open during expansion of the chamber, a spring biased leverage under joint action of the chamber and the first spring for urging the valve toward closed position upon extinguishment of the pilot flame, means responsive to the temperature of the space to be heated, and a second leverage within the casing and actuated by the space temperature responsive means to urge the valve closed upon increase of the space temperature above a predetermined value.

4. In a systm for controlling the supply of a fluid fuel, a space heating main burner, a pilot burner, a valve casing, a valve within the casing for controlling the flow of fuel to the main burner, means defining a chamber expanded in response to combustion of fuel at the pilot burner and contracted upon extinguishment of the pilot flame, a compression spring seated between the valve and the chamber for urging the valve during expansion of the chamber, a leverage jointly controlled by the pilot burner responive means and the spring, a second spring acting on the leverage and effective to urge the valve toward closed position only upon extinguishment of the pilot flame, means responsive to the temperature to the space to be heated, and a second leverage within the casing and actuated by the space temperature responsive means to urge the valve closed upon increase in the space temperature above a predetermined value.

5. In a system for controlling the supply of a fluid fuel, a space heating main burner, a pilot burner, a valve casing, a valve within the casing for controlling the flow of fuel to the main burner, means responsive to combustion of fuel at the pilot burner, resilient means acting between the valve and the pilot responsive means for urging the valve open during combustion of fuel at the pilot burner, a biased leverage within the casing for urging the valve toward closed position, said pilot responsive means acting on the leverage to prevent operation thereof during combustion of fuel at the pilot burner and allowing the leverage to close the valve when the pilot flame is extinguished, means expanding responsive to the temperature of the space to be heated, a leverage within the casing for transmitting the force of expansion of the space temperature responsive means to the valve to urge the valve closed upon increase of the space temperature, and force-multiplying means operable from externally of the casing for directly adjusting the action of the space responsive means.

6. In a system for controlling the supply of a fluid fuel, a space heating main burner, a pilot burner, a valve casing, a valve within the casing for controlling the flow of fuel to the main burner, means responsive to combustion of fuel at the pilot burner, resilient means acting between the valve and the pilot responsive means for urging the valve open during combustion of fuel at the pilot burner, a biased leverage within the casing and urging the valve toward closed position, said pilot responsive means acting on the leverage to prevent operation thereof during combustion of fuel at the pilot burner and allowing the leverage to close the valve when the pilot flame is extinguished, means expanding responsive to the temperature of the space to be heated, a second leverage within the casing for transmitting the force of expansion of the space temperature responsive means to the valve to urge the valve closed upon increase of the space temperature, a lever within the casing and opposing expansion of the space temperature responsive means, and a screw extending through the casing and bearing on the lever for adjusting the force opposing the space temperature responsive means.

7. In a system for controlling the supply of a fluid fuel, a space heating main burner, a pilot burner, a valve casing, a valve within the casing for controlling the flow of fuel to the main burner, means responsive to combustion of fuel at the pilot burner, resilient means acting between the valve and the pilot responsive means for urging the valve open during combustion of fuel at the pilot burner, a biased leverage within the casing for urging the valve toward closed position, said pilot responsive means acting on the leverage to prevent operation thereof during combustion of fuel at the pilot burner and allowing the leverage to close the valve when the pilot flame is extinguished, means responsive to the temperature to the space to be heated, a solenoid energized responsive to temperature changes in a second space to be heated, and a second leverage within the casing and jointly actuated by the space temperature responsive means and the solenoid for urging the valve toward closed position.

8. In a system for controlling the supply of a fluid fuel, a space heating main burner, a pilot burner, a valve casing, a valve within the casing for controlling the flow of fuel to the main burner, means responsive to combustion of fuel at the pilot burner, resilient means acting between the valve and the pilot responsive means for urging the valve open during combustion of fuel at the pilot burner, a biased leverage within the casing urging the valve toward closed position, said pilot responsive means acting on the leverage to prevent operation thereof during combustion of fuel at the pilot burner and allowing the leverage to close the valve when the pilot flame is extinguished, a solenoid energized responsive to the temperature of the space to be heated, and a spring urging the solenoid armature to press the valve toward closed position, the armature being retracted against the force of the spring upon energization of the solenoid.

ROY W. JOHNSON.
CEDRIC E. ZARWELL.

REFERENCES CITED

The following references are of record in the file of this patent:

UNITED STATES PATENTS

| Number | Name | Date |
| --- | --- | --- |
| 1,842,328 | TePas | Jan. 19, 1932 |
| 1,908,477 | Eggleston | May 9, 1933 |
| 1,961,324 | Andersson | June 5, 1934 |
| 1,980,789 | Dillman | Nov. 13, 1934 |
| 2,085,300 | Dillman | June 29, 1937 |
| 2,159,617 | Kronmiller | May 23, 1939 |
| 2,177,380 | Andersson | Oct. 24, 1939 |
| 2,185,978 | Dillman | Jan. 2, 1940 |
| 2,247,060 | Levine | June 24, 1941 |
| 2,288,890 | Denison | June 7, 1942 |
| 2,293,556 | Newton | Aug. 18, 1942 |

Certificate of Correction

Patent No. 2,457,378.                                December 28, 1948.

ROY W. JOHNSON ET AL.

It is hereby certified that error appears in the printed specification of the above numbered patent requiring correction as follows:

Column 6, line 53, claim 1, for the word "respective" read *responsive*; and that the said Letters Patent should be read with this correction therein that the same may conform to the record of the case in the Patent Office.

Signed and sealed this 3rd day of May, A. D. 1949.

[SEAL]

THOMAS F. MURPHY,
*Assistant Commissioner of Patents.*